June 4, 1935.  J. R. GRUNDY  2,003,848

FLEXIBLE COUPLING

Filed March 8, 1928

Inventor:
John R. Grundy,
by his Attorneys
Howson & Howson

Patented June 4, 1935

2,003,848

UNITED STATES PATENT OFFICE 2,003,848

FLEXIBLE COUPLING

John R. Grundy, Philadelphia, Pa., assignor to Charles Bond Company, Philadelphia, Pa., a corporation of Pennsylvania Application March 8, 1928, Serial No. 260,052

6 Claims. (Cl. 64—96)

This invention relates to improvements in flexible couplings, and the principal object of the invention is to provide a coupling of desirable form that will be efficient and durable in operation, and that will exceed in these respects couplings of the same general type as made in accordance with the prior practices.

Figure 1:
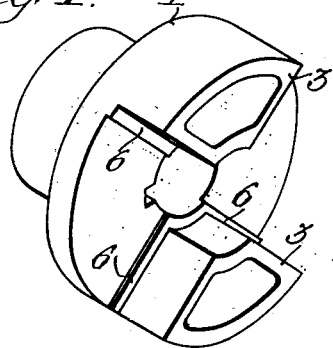
Figures 1, 2 and 3, show, respectively and in perspective, the three essential parts of a coupling made in accordance with my invention.
Figure 2:
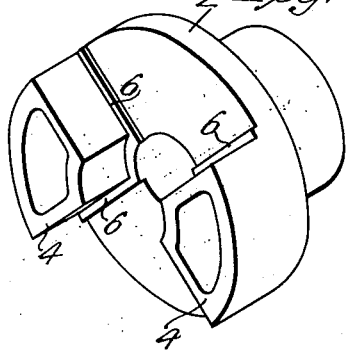
Figure 3:
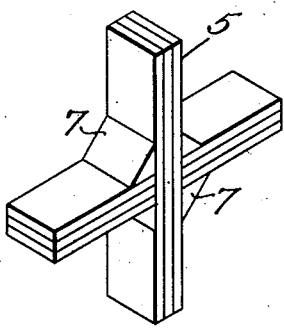
Figure 5:
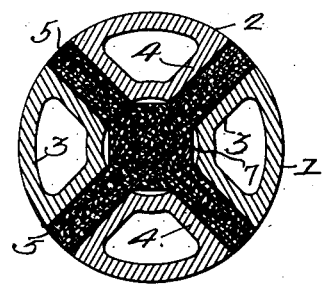
Fig. 5 is a section on the line 5—5, Fig. 4.
Figure 4:
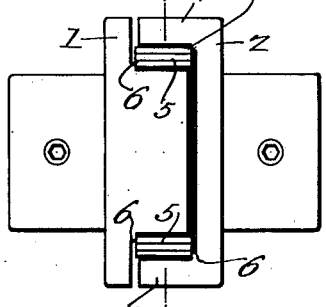
Fig. 4 is a side view of the assembled coupling.

Referring to the drawing, the coupling in a preferred form comprises the two flange members 1 and 2, shown respectively in Figs. 1 and 2, which are adapted to be attached to the ends of the shafts to be coupled and which have on their outer faces in each instance a diametrically opposite pair of segmental projections 3, 3 and 4, 4 which in assembly are adapted to intermesh, as illustrated in Figs. 4 and 5. The dimensions of these projecting segmental lugs are such as to afford space between the adjacent sides thereof for an intermediate member 5 shown in Fig. 3, which is in the form of a cross whose radiating arms in the assembled coupling occupy positions between the lugs 3 and 4, as clearly shown in Fig. 5. The flat sides of the lugs 3 and 4 are so formed as to create a flat bearing for the arms of the intermediate cross member 5. Also as illustrated in Figs. 1 and 2, it is preferred to provide at the bases of the lugs 3 and at opposite sides thereof slightly elevated shoulders 6 against which in assembly the intermediate cross member 5 bears, as shown in Fig. 4.

The intermediate member 5 is preferably made of a relatively soft and pliable material, such as leather, fibre or bakelite composition. In the present instance, I have shown it made in laminated form of strips of leather reinforced at the center where the arms are conjoined by triangular reinforcing elements 7.

Figure 6:
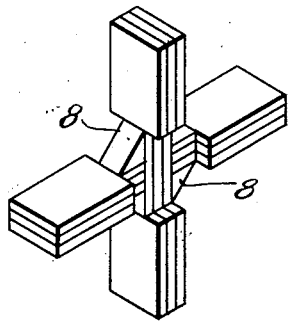
Fig. 6 is a view in perspective of a modified form of the element illustrated in Fig. 3.

In Fig. 6, a modified form of this element is shown in which the sides are centrally recessed, as indicated at 8, so as to provide additional space into which the ends of the shafts which carry the members 1 and 2 may project. Functionally, this element is the same as that shown in Fig. 3. In any case, it is desirable that the thickness of the arms of the intermediate member 5 be somewhat less than the spaces between the lugs 3 and 4 which they occupy, this affording a desirable flexibility in the coupling.

Heretofore it has been customary in this general type of coupling to attach by various means facings of the relatively soft material, such as leather, to the lugs 3 and 4 themselves whereby the facings become in effect a part of the members 1 and 2. This form of device has been found defective by reason of the fact that the relative movements between the coupling members quickly destroy the facings attached to the lugs. I have discovered that by forming an entirely independent intermediate member in one piece mounted as described between the lugs and with sufficient play to permit a certain amount of self-adjustment in operation, an extremely efficient coupling is formed which is very durable and capable of extended periods of operation without attention.

There obviously may be some modification in the form of the various individual parts without departure from the invention as defined in the appended claims.

I claim:

1. The combination in a coupling for connecting substantially aligned shafts, of a pair of coupling members each adapted to be secured to one of said shafts, each of said coupling members having projecting lugs intermeshing with the lugs on the other coupling member, the adjacent lugs on opposite coupling members being provided with flat surfaces lying parallel to a plane midway between them containing the axis of one of said shafts, and a resilient power transmitting member mounted between said coupling members and having radiating arms of resilient material contacting with adjacent flat faces of two of said lugs carried by opposite coupling members.

2. The combination in a coupling for connecting substantially aligned shafts, of a pair of coupling members each adapted to be secured to one of said shafts, each of said coupling members having a plurality of lugs extending longitudinally of said shaft to intermesh loosely with the corresponding lugs carried by the other coupling member, the faces of adjacent lugs carried by opposite coupling members being parallel to each other, and a resilient power transmitting member mounted between said coupling members and comprising a plurality of radiating arms made up of relatively fixed parts each adapted to contact with two of said parallel faces.

3. The combination in a coupling for connecting substantially aligned shafts, of a pair of coupling members each adapted to be secured to one of said shafts, said coupling members having lugs intermeshing loosely with each other, and a spider mounted between said members and having resilient arms each extending between and contacting directly with two of said lugs carried by opposite members, each of said spider arms having opposite lug engaging parts normally extending parallel to each other and being subjected to compressive stresses only in transmitting forces from one contacting lug to the other contacting lug.

4. The combination in a coupling for connecting substantially aligned shafts, of a pair of coupling members each adapted to be secured to one of said shafts, each of said coupling members having projecting lugs intermeshing loosely with the lugs on the other member, and a power transmitting member mounted between said coupling members and having radiating resilient arms each contacting on opposite parallel faces with adjacent faces of lugs carried by opposite coupling members, said arms being subjected to compressive stresses only in transmitting forces from one coupling member to the other coupling member.

5. The combination in a coupling for connecting substantially aligned shafts, of a pair of coupling members each adapted to be secured to one of said shafts, each of said coupling members having a plurality of lugs extending longitudinally of said shaft to intermesh loosely with the corresponding lugs carried by the other coupling member, the faces of adjacent lugs carried by opposite coupling members being parallel to each other, and a power transmitting member formed entirely of resilient material having a resilient hub and radiating resilient arms each arranged with its surface contacting with two of said parallel faces.

6. The combination in a coupling for connecting substantially aligned shafts, of a pair of coupling members each adapted to be secured to a separate one of said shafts, each of said coupling members having a plurality of lugs extending longitudinally of said shafts to intermesh loosely with the corresponding lugs carried by the other coupling member, the faces of adjacent lugs carried by opposite coupling members being parallel to each other and parallel to a radius of the coupling, and a power transmitting member formed entirely of yielding material and comprising a yielding hub having radiating arms of yielding material each contacting directly with said parallel faces of two of said lugs.

JOHN R. GRUNDY.